(12) United States Patent
Stencel et al.

(10) Patent No.: US 8,050,788 B2
(45) Date of Patent: Nov. 1, 2011

(54) APPARATUS AND METHOD FOR OPTIMIZING AN ASSEMBLY PROCESS WITH LOCAL POSITIONING USING INERTIAL GUIDANCE CAPABILITIES

(75) Inventors: John Stencel, Highland, MI (US); Vijayendra Srinivas Hadagali, Canton, MI (US); Henry Arthur Loos, Jr., Sterling Heights, MI (US)

(73) Assignee: Fives Cinetic Inc., Farmington Hills, MI (US)

( * ) Notice: Subject to any disclaimer, the term of this patent is extended or adjusted under 35 U.S.C. 154(b) by 517 days.

(21) Appl. No.: 12/203,232

(22) Filed: Sep. 3, 2008

(65) Prior Publication Data
US 2010/0057243 A1    Mar. 4, 2010

(51) Int. Cl.
*G05D 3/20* (2006.01)
(52) U.S. Cl. .......... 700/117; 700/261; 700/95; 382/107; 382/128; 600/587
(58) Field of Classification Search .................. 700/117, 700/261, 95; 382/107, 128; 600/587
See application file for complete search history.

(56) References Cited

U.S. PATENT DOCUMENTS
2008/0285805 A1* 11/2008 Luinge et al. ................. 382/107
* cited by examiner

*Primary Examiner* — Kidest Bahta
*Assistant Examiner* — Tejal Gami
(74) *Attorney, Agent, or Firm* — Quinn Law Group, PLLC

(57) ABSTRACT

An apparatus includes a handheld tool for executing an assembly process within a confined work space. A local positioning module (LPM) is connected to the tool to collect raw data describing motion of the LPM and tool within the work space. A control unit communicates with a host machine and the tool, and updates an assembly setting of the tool. The host executes a control action when a position determined using the raw data is not equal to a corresponding position in a predetermined sequence. A method calculates the present position of a handheld torque wrench using three gyroscopes and three accelerometers, and calculating a present position of a fastener using the present position of the tool. The present position of the fastener is compared to a corresponding position in the predetermined sequence, and the torque wrench is disabled when the fastener position is not equal to the corresponding position.

11 Claims, 3 Drawing Sheets

APPARATUS AND METHOD FOR OPTIMIZING AN ASSEMBLY PROCESS WITH LOCAL POSITIONING USING INERTIAL GUIDANCE CAPABILITIES

TECHNICAL FIELD

The present invention relates to an apparatus and method for local positioning using inertial guidance capabilities to thereby optimize a manufacturing assembly process within a confined assembly work space.

BACKGROUND OF THE INVENTION

Various methods and devices exist for determining the relative position of a person or an object, with accuracies varying widely depending on the particular technology that is utilized. For example, a global positioning system (GPS) receiver embedded or contained within a portable or vehicle-mounted navigation system allows a user to receive satellite-transmitted positional information. Depending on the number of GPS signal transmitting satellites positioned within line of sight of the receiver at a given moment, the positional information can vary in both relative accuracy and specificity. That is, using GPS capabilities, 2-dimensional (2D) information, i.e., the present latitude and longitude of the user, or 3D positional information, i.e., the user's latitude, longitude, and altitude, can be provided within a fair degree of accuracy, in some cases as low as approximately ±3 meters of their true position.

By way of contrast, a local positioning system (LPS) can be used to provide more precise positional information. For example, by using an LPS device or devices in a large manufacturing facility one can identify a particular area or zone of the facility in which a pallet of supplies or inventory is located, or a loading dock on which a shipment awaits shipping or receiving. A few of the more common LPS technologies include optical detection devices, infrared systems, ultra-wide band detection, and radio frequency identification (RFID) tagging, with each technology having its own advantages and disadvantages. For example, while RFID tagging is useful for certain purposes such as securely tagging a piece of merchandise to minimize theft, such a device has a limited effective distance and accuracy. Likewise, optical systems and infrared systems can perform in a less than optimal manner when used in certain high-precision applications, due in part to the potential interference provided by the many obstructions encountered in a modern work space, e.g., metallic structures and/or proximate heat sources.

In a high-volume manufacturing assembly environment, certain steps in the assembly process can be automated to minimize cost and increase production throughput and accuracy. Assembly robots having an associated hard-wired data encoder for each axis of movement can rapidly perform traditionally labor intensive assembly steps such as fastening, welding, painting, etc. However, when a work piece is positioned in a relatively restricted or confined work space, the use of an automated assembly robot may not be efficient, or even feasible. In such cases, an operator having a handheld assembly tool can enter the confined work space to perform the required assembly steps, such as is commonly experienced in certain automotive assembly processes. The conventional global and local positioning devices and methods described above can be less than optimal in such applications, particularly when the positioning devices are used for measuring the often incremental positional changes of the assembly tool as it moves between assembly positions within the confined work space.

SUMMARY OF THE INVENTION

Accordingly, an apparatus and method for local positioning are provided using inertial guidance capabilities within a relatively confined work space. The apparatus and method optimize a manufacturing assembly process requiring the completion of certain discrete assembly steps within the relatively confined work space, exemplified herein by an approximately 3 meter (3 m)×3 m work cell. In the assembly of an automobile in particular, physical access to a part positioned in an engine compartment, in a passenger compartment, or in other portions of the vehicle can be partially obstructed by the structure of the vehicle frame or body, thus preventing the efficient use of an assembly robot as described above.

In such a situation, an operator manually installs fasteners or executes other assembly steps using a handheld assembly tool, exemplified herein as an automatic torque wrench. Moreover, the fasteners generally must be installed in a particular sequence, and with potentially different torque settings at each of the positions in the sequence. Because of this, operators are ordinarily trained on the correct sequence and torque settings for a given assembly process, with the operator adjusting the torque settings of the tool as needed, by such means as by using an automated socket I/O tray of the type known in the art. Using conventional methods, errors by the operator as to the correct next fastener position or proper torque setting may not be detected until after the fastener is installed, potentially resulting in costly rework of the work piece.

Within the scope of the invention, the apparatus includes a handheld assembly tool, such as but not limited to an exemplary handheld torque wrench, which is configured to execute the assembly process within the relatively confined work space. A local positioning module (LPM) is connected to the tool, and includes a plurality of miniaturized sensors operable for collecting or gathering a set of raw data fully describing the dynamics or motion of the tool as it moves within the work space. The raw data is transmitted to a host machine where it is used to continuously calculate the present position of the tool within the work space, and thus any object being installed using such a tool, for example a threaded fastener when the tool is configured as a handheld torque wrench.

The host is in wireless communication with the LPM. The calculated position of the fastener or other installed component is compared to a corresponding position in a predetermined sequence. A control unit communicates with each of the host and the LPM, and automatically updates an assembly setting of the tool as needed in response to a signal from the host. The host is therefore configured to signal the control unit to automatically update the assembly setting, and can execute one or more control actions when the present position of the fastener is not equal to the corresponding position in the predetermined sequence.

The LPS apparatus can signal or prompt the operator with the correct next fastener position in the predetermined sequence, i.e., the "corresponding position", via a display device configured as a graphical user interface (GUI) or other suitable device. The LPM is sufficiently miniaturized and mounted to or within the tool, and is capable of precisely collecting the set of raw data to be used for calculating and tracking the changing position of the tool. If the tool is configured as a torque wrench, the position of the fastener can be determined to accuracies of within a fraction of an inch, with the distance from the LPM to a fastener being installed by the torque wrench being a known or calibrated value.

As noted above, the LPM is in wireless or remote communication with the host, which can be achieved via Bluetooth wireless technology or other suitable wireless or remote means, with the host executing the method of the invention via a control algorithm. Also when configured as a torque wrench, the control unit can be configured as a fastener control unit (FCU) which automatically updates the assembly settings of the tool, such as by automatically downloading the correct torque and angle settings, or by selecting the correct fastening program for controlling the torque wrench, as commanded or signaled by the host in accordance with the predetermined sequence.

Communication between the host and the LPM allows an automatic verification of the correct assembly position, exemplified herein as the next fastener position or corresponding position, as well as instant verification of the correct assembly settings at the corresponding position in the predetermined sequence. After a fastener is installed, the operator is again prompted via the GUI or other device with the correct next fastener position, with the corresponding position being determined by automatic reference by the host to the predetermined sequence.

The host can collect and store, either locally or in a separate database, historical assembly data in order to provide a record. Such a record can be useful for quality assurance or quality control purposes, to improve operator training, to support a warranty return or repair process, etc. The historical assembly data can be collected automatically in real time by continuously downloading the data to the host and/or an associated database, or at predetermined intervals, e.g., at a preset interval such as at the end of an assembly run of predetermined length. An appropriate control action can be executed as needed at any point in the assembly run, such as but not limited to passage or transmission of a message directly to the operator via the GUI, temporary disablement of the tool until corrective action can be taken, the selective illumination of an audio and/or visual device separate or remote from the GUI, etc.

A method for optimizing a fastener installation process within a confined work space includes collecting the set of raw data describing the motion of the handheld torque wrench within the confined work space, or more precisely the motion of a plurality of sensors connected to the torque wrench, with the sensors including three gyroscopes and three accelerometers. Preferably, the sensors also include three magnetometers and a temperature sensor as described hereinbelow to further refine the positional accuracy of the set of raw data. The method also includes calculating a present position of a threaded fastener being installed by the handheld torque wrench using the set of raw data collected by the sensors, transmitting the set of raw data to a host, calculating the present position of the tool, and comparing the present position to a corresponding position in a predetermined assembly sequence. Control actions can be taken as needed, including temporarily disabling the handheld torque wrench when the present position of the threaded fastener is not equal to the corresponding position in the predetermined sequence.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
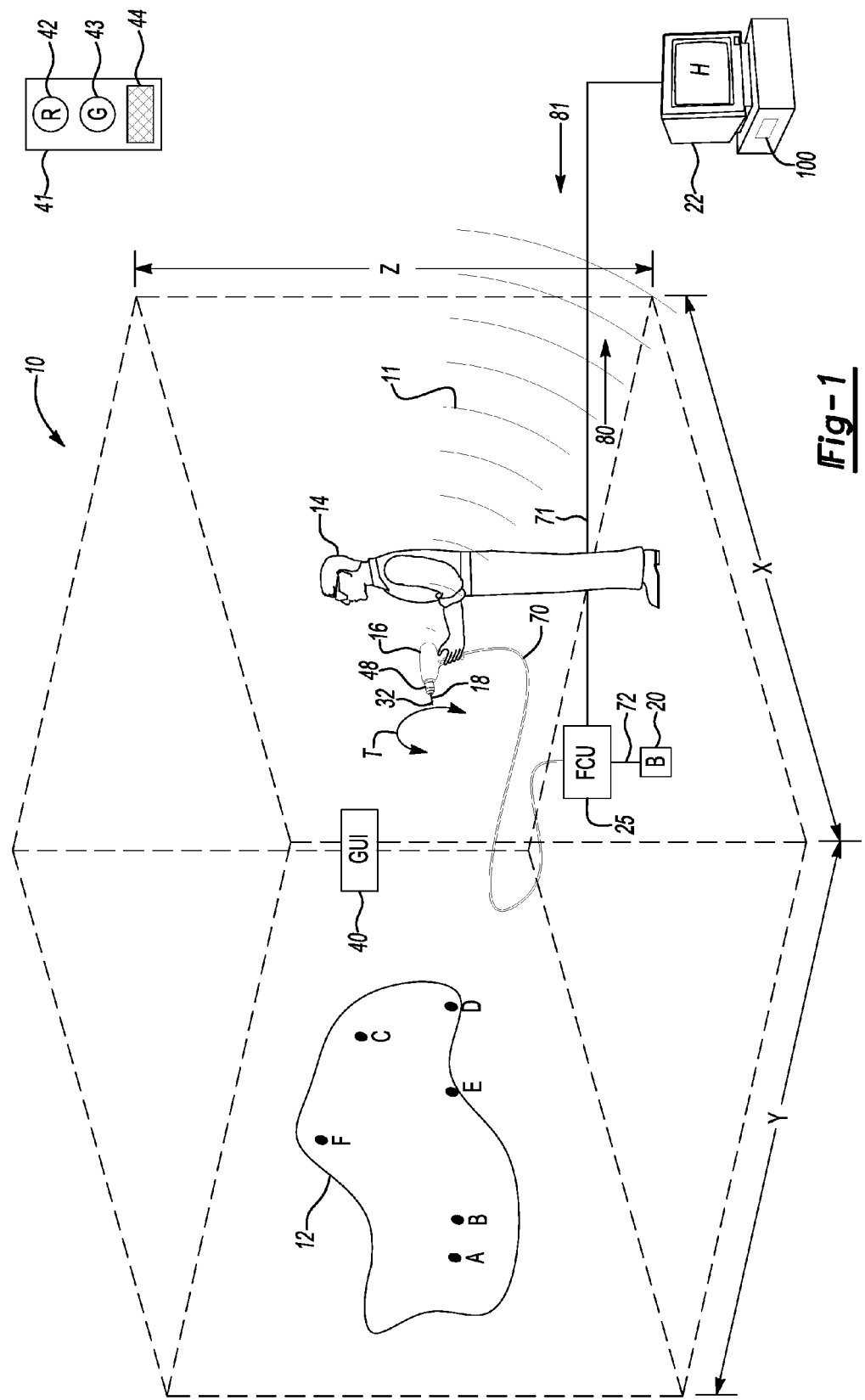
FIG. 1 is a schematic illustration of a local positioning system (LPS) apparatus used in a confined assembly work space or cell.

Referring to the drawings wherein like reference numbers correspond to like or similar components throughout the several figures, and beginning with FIG. 1, a relatively confined manufacturing work space or cell 10 is defined by its three primary axes, i.e., an X axis describing the depth of the cell 10, a Y axis describing its width, and a Z axis describing its height. In the exemplary embodiment of FIG. 1, the axes X, Y and Z define an approximately 3 m×3 m area representative of a relatively restricted confined assembly work space.

As discussed above, the assembly of a vehicle or another similarly complex structure at times requires the physical intrusion of an operator 14 into an area of the vehicle defined by the vehicle body, such as but not limited to a passenger interior, an engine compartment, or another relatively confined work space. In such a work space, screws, bolts, or other threaded fasteners, represented generally in FIG. 1 by a fastener 32, must be installed in a predetermined sequence. Moreover, each fastener 32 can have a unique torque specification or setting, i.e., torque and angle settings as those terms are understood in the art, and therefore an error by the operator 14 as to the correct next fastener position and/or torque setting for a given position can potentially lead to assembly errors and costly rework.

Figure 2:
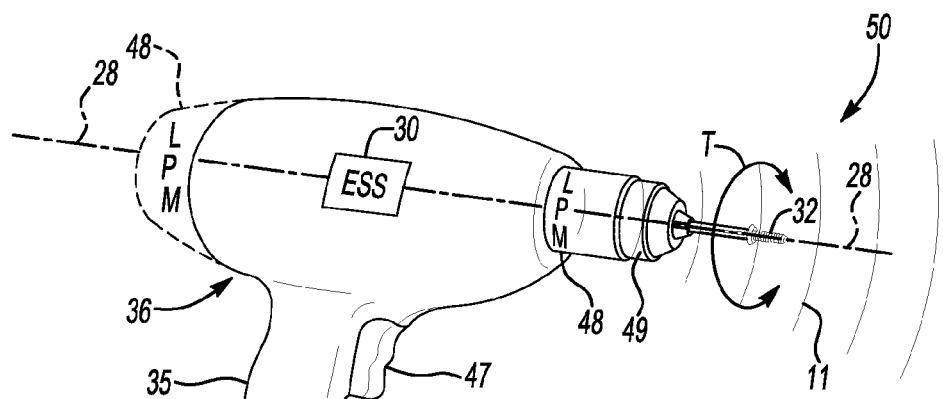
FIG. 2 is a schematic illustration of a handheld assembly tool and a host machine of the LPS apparatus of FIG. 1.

To work in a confined work space, an operator 14 holds a portable or handheld assembly tool 16, which in the exemplary embodiment of FIGS. 1 and 2 is configured as a portable and rechargeable electric torque wrench, although other assembly devices such as welding torches, impact drivers, rivet guns, glue guns, etc., can be used within the scope of the invention, as will be understood by those of ordinary skill in the art. When configured as a torque wrench as shown in FIG. 1, the tool 16 has a rotatable shaft 18 that is capable of delivering a predetermined torque (arrows T) to the fastener 32 when a force is exerted on a trigger 47 (see FIG. 2) by the operator 14, such as by activating an electric motor (not shown) inside of the tool 16. The tool 16 has a local positioning module (LPM) 48 adapted for collecting a set of raw data 11, which is ultimately used to precisely calculate or otherwise determine the position of the fastener 32 in its XYZ inertial frame of reference during its installation, as will be discussed below with reference to FIG. 2.

Within the cell 10, a plurality of the fasteners 32 are installed into a work piece 12 in a predetermined sequence, as represented by a particular order of the fastener positions A-F, respectively. For example, a fastener 32 can be installed first at position A, followed by another fastener 32 at position B, followed by another fastener 32 at position C, etc. The sequence A, B, C, etc., is illustrative, and can be any combination of the available positions, e.g., C, B, A or B, A, C, etc., as determined by a predetermined sequence 34 (see FIG. 2) stored in or accessible by a server or a host machine, referred to hereinafter as the host 22 for simplicity. Also for simplicity, only six fastener positions (A-F) are shown in FIG. 1. However, it is understood that more or fewer fasteners 32 can be provided within the scope of the invention depending on the predetermined sequence 34 of FIG. 2, with each fastener 32 having a corresponding position.

The host 22 includes a control algorithm 100 suitable for executing the method of the invention, with the host 22 being in continuous wireless communication with the LPM 48 over a wireless pathway to receive the set of raw data 11, such as via Bluetooth wireless technology or other suitable wireless communications means, as the tool 16 moves within the cell 10. The host 22 is also in communication with a fastener control unit (FCU) 25 via a cable 70. The FCU 25 is operable for automatically updating the assembly settings of the tool 16, such as by automatically downloading or updating the torque and angle settings of the tool 16 when the tool 16 is configured as a torque wrench.

Likewise, the FCU 25 is operable for determining the torque and angle applied to any fastener 32 during its installation, and passing this data to the host 22 for validation, thus minimizing instances of cross threading or false torque measurements. The FCU 25 is adapted to transmit information, data, and/or signals (arrow 80) describing the torque and angle measurements to the host 22 via another cable 71 or other suitable communications pathway to thereby enable data collection and recording by the host 22. The host 22 is likewise adapted to transmit information, data, or signals (arrow 81) to the FCU 25 via the cable 71 or other suitable communications pathway to enable automatic and optimized control of the tool 16. Finally, a stationary base unit 20 having calibrated coordinates, i.e., a fixed or known position, is in communication with the FCU 25 via a cable 72. The base unit 20 is configured to receive the tool 16 upon completion of the predetermined sequence or run in order to properly recalibrate or zero the tool 16 as described below with reference to FIG. 3, and to thereby minimize any accumulative positional error.

Referring briefly to FIG. 2, the host 22 includes a communications control module (CCM) 38 that enables remote or wireless communications with the LPM 48. The CCM 38 executes various programs or algorithms, including the algorithm 100 of FIG. 3 described below, that together control the operation of the tool 16. Accordingly, the CCM 38 can be configured as a microprocessor-based device having such common elements as a microprocessor or CPU 39, memory 54 including but not limited to: read only memory (ROM), random access memory (RAM), electrically-programmable read-only memory (EPROM), etc., and any required electronic circuitry 55, including but not limited to: a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry. However it is ultimately configured, the host 22 preferably supports most commonly-used field buses, such as but not limited to: DeviceNet, Profibus, Ethernet IP, ProfiNet, etc. so as to readily communicate with programmable logic controllers (PLC) or other devices.

The tool 16 includes an energy storage system (ESS) 30, for example a rechargeable nickel cadmium or lithium ion battery, a capacitance module, and/or other another suitable energy storage device. The tool 16 can include electrical contacts or leads 23 for recharging the ESS 30 when returned to the base unit 20, and/or to signal for the transmission of information or data to the host 22 once the tool 16 is connected or returned to the base unit 20. Recharging of the ESS 30 can be alternately provided from the FCU 25 via the cable 70 if so configured.

The ESS 30 can be used as needed for powering the sensors of the LPM 48, or for powering some or all of the energy needed for operating the tool 16. When the tool 16 is configured as a torque wrench as shown in the various figures, applied torque (arrows T) can be varied automatically by automatically updating or changing the torque setting of the tool 16 by passing torque settings (arrow 84) from the FCU 25 via the cable 70, as determined by the host 22 according to the predetermined sequence 34.

Referring again to FIG. 1, the host 22 automatically prompts the operator 14 with a correct first bolt position from the predetermined sequence 34 of FIG. 2, and then verifies and/or updates the torque settings used by the tool 16 at that particular position. The prompt to the operator 14 is provided via a display device, such as a touch-screen graphical user interface or GUI 40 positioned within the cell 10 or in close proximity thereto, such that the GUI remains readily viewed by the operator 14 as assembly progresses in the cell 10. The position of the tool 16 and the LPM 48 connected thereto is zeroed or recalibrated using the calibrated or known fixed position of the base unit 20 before assembly commences, and again after assembly is finished, in order to minimize any accumulated positional error. After each step, the operator 14 is again prompted with correct next fastener position in the predetermined sequence 34 of FIG. 2., while any associated torque and angle data is automatically collected by the FCU 25 and relayed to the host 22 for historical data collection, either in real time or at predetermined intervals, such as at the end of a run or sequence when the tool 16 is returned to the base unit 20.

Within the scope of the invention, the tool 16, the host 22, the algorithm 100, the FCU 25, and the base unit 20 are the integral components of a local positioning system (LPS) apparatus 50. Using the LPS apparatus 50, the current position of the tool 16, and therefore each of the fasteners 32 being installed using the tool 16, are precisely determined within the cell 10 and validated against values provided by the predetermined sequence 34 (see FIG. 2). One or more control actions can be taken at any point in the assembly process, such as but not limited to: temporarily disabling the tool 16 until the correct corresponding position or calibrated torque and angle settings for a corresponding position in the predetermined sequence 34 is verified by the host 22, displaying a message to the operator 14 on the GUI 40, temporarily disabling the tool 16 until the correct corresponding position is achieved, activating an optional external audio/visual alarm device 41 which can be external to the cell 10, or any other desired control action.

In the exemplary embodiment of FIG. 1, the optional external audio/visual device 41 can include a suitable visual indicator, e.g., a red lamp (R) 42 and a green lamp (G) 43, and/or an audio speaker 44 in order to simplify or customize the feedback message communicated to the operator 14 and/or to another person situated outside of the cell 10, for example a production supervisor, remote quality control monitoring station, etc. In such an embodiment, the illumination of the red lamp 42 can indicate a fault condition or error, illumination of the green lamp 43 can indicate proper conformance of the positioning and torque settings to any calibrated settings for each, and the audio speaker 44 can be used to emit a tone or alarm in the event the positioning and/or torque settings do not conform to calibrated specifications, etc.

The LPS 50 is adapted to collect the raw data 11 which is used to ultimately identify the X, Y and Z coordinates of a single object, in this case the LPM 48 in or on the tool 16, within the cell 10. The distance from the LPM 48 to the fastener 32 is known, as the head of a fastener 32 being installed is always the same distance from the LPM in the tool 16. Thus, the host 22 can calculate a present position of the fastener 32 based on the calculated position of the LPM 48.

The present position of the fastener 32 can be resolved down to a fraction of an inch within the cell 10 using a plurality of sensors, which collectively describe the LPM 48 also shown in FIG. 2. A single point of interest within the space defined by the cell 10 can be identified within one second of resolution so that when tightening of a fastener 32 is completed, its associated coordinate information is instantly made available to the host 22 to allow the association of the torque information to a predetermined fastener position in the predetermined sequence. In other words, the LPM 48 is configured to capture or collect the set of raw data 11 in order to fully describing the roll, pitch, and yaw of an object, e.g., the fastener 32, with respect to the X, Y and Z axes, respectively, within the XYZ inertial frame of reference in the cell 10.

Referring again to FIG. 2, the LPS apparatus 50 is shown in more detail, with the tool 16 in wireless communication with the host 22. The tool 16 includes the LPM 48 described above. The LPM 48 is positioned on an axis of rotation 28 of the shaft 18 of the tool 16, preferably in close proximity to the shaft 18 as shown in FIG. 2. For example, the LPM 48 can be provided with a circular cross section as shown in FIG. 2A and placed immediately adjacent to the shaft 18 as shown in FIG. 2, or can be annular or ring shaped such that the LPM 48 circumscribes the shaft 18, thus allowing the shaft 18 to rotate freely radially-inward of the LPM 48 while the LPM 48 remains fixed to the tool 16.

Alternately, the LPM 48 can be mounted to the butt end 36 of the tool 16 above a grip portion 35 of the tool as shown in phantom in FIG. 2, with the center of the LPM 48 still preferably positioned on the axis of rotation 28 to improve overall accuracy of the calculations. In either case, the distance from the LPM 48 to the fastener 32 is known, and therefore the algorithm 100 can readily calculate the position of the fastener 32 relative to the position of the LPM 48. Therefore, the present position of the fastener 32 can be compared to a corresponding position in the predetermined sequence 34, while the present torque settings at that position can be updated as needed to comply with any torque settings in the predetermined sequence or referenced thereby.

Figure 2A:
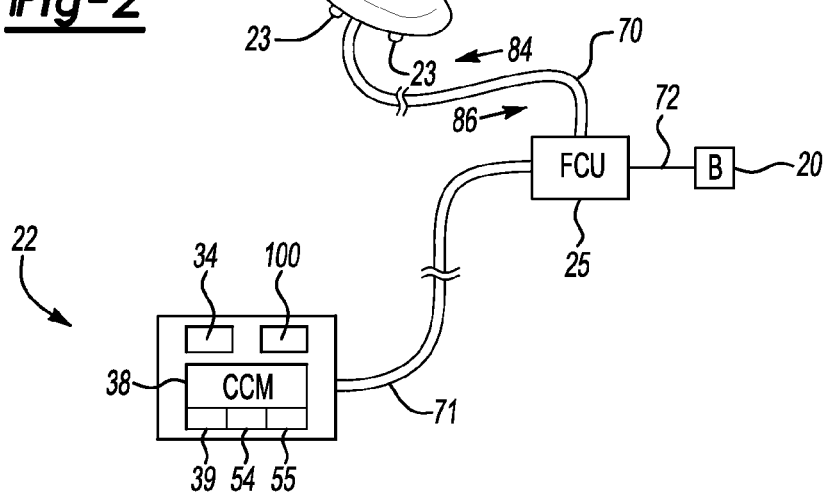
FIG. 2A is a schematic illustration of a local positioning module (LPM) usable with the handheld assembly tool of FIG. 2.
Figure 2A:
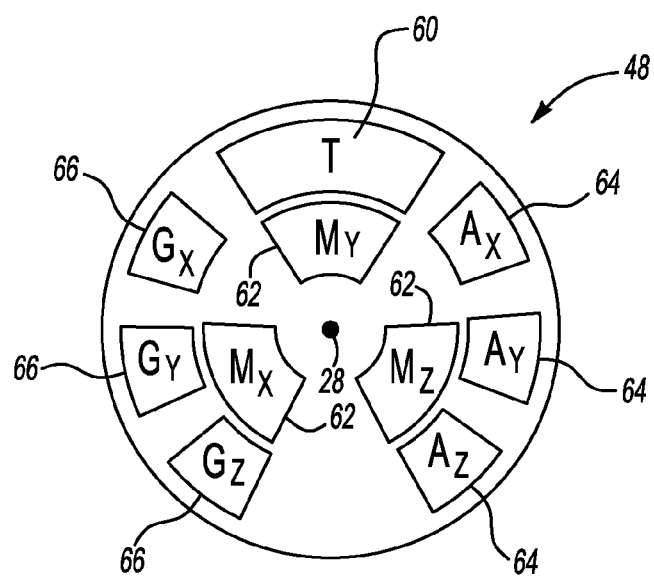

Referring to FIG. 2A, the LPM 48 is preferably sufficiently miniaturized so as not to overly burden or encumber the tool 16. Such miniaturized inertial sensor modules or inertial measurement units (IMU) capable of producing the set of raw data 11 usable by the LPS apparatus 50 are commercially available from various sources. See for example the nIMU, uIMU, and Bluetooth IMU offered by MEMSense LLC of Rapid City, S.D. The LPM 48 includes a plurality of sensors including three accelerometers 64, which are also labeled $A_X$, $A_Y$, and $A_Z$ to refer to their dedicated axis within the XYZ inertial frame for clarity, and three gyroscopes 66 also labeled $G_X$, $G_Y$, and $G_Z$. Additionally, an optional temperature sensor (T) 60 and three magnetometers 62, also labeled $M_X$, $M_Y$, and $M_Z$, can be included in the LPM 48 to further adjust or refine the accuracy of the set of raw data 11.

As evident by the name, the temperature sensor 60 measures the temperature of the LPM 48. The magnetometer 62 measures the strength and direction of the magnetic field in the vicinity of the LPM 48. Each of these sensors can provide data for further refining the present position of the LPM 48, or of the fastener 32, which is primarily determined by the accelerometers 64 and gyroscopes 66. The accelerometers 64 collectively establish the linear acceleration of the LPM 48 as it moves within the cell 10 of FIG. 1, while the gyroscopes 66 collectively establish the frame of reference for the X, Y and Z axes of the LPM 48 as described above.

That is, three accelerometers 64 and three gyroscopes 66 continuously collect the set of raw data 11 (see FIGS. 1 and 2) precisely describing the motion of the LPM 48 and tool 16 with respect to the X, Y and Z axes. The distance to the fastener 32 at the end of the shaft 26 of FIG. 2 is known, and therefore the host 22 can use this value to continuously calculate the present position of the fastener 32 using this data. That is, the host 22 can use the set of raw data 11 to determine the roll or rotation of a given fastener 32 about the X-axis (see FIG. 1), the pitch or rotation of the fastener 32 about the Y-axis, and the yaw or rotation of the fastener 32 about the Z-axis and establish the angular velocity of each fastener 32, while the accelerometers 64 measure the associated linear acceleration of each fastener 32. As noted above, temperature compensation and magnetic field adjustment can be made using data from the temperature sensor 60 and the magnetometers 62, respectively. In this manner, the position of the fastener 32 is precisely determined.

Referring again to FIG. 1, the GUI 40 allows alphanumeric prompts to be transmitted to the operator 14. The raw data 11 from the LPM 48 is transmitted wirelessly to the host 22, and the next fastener position A-F is displayed on the GUI 40. The current fastener positions can be associated with correct or calibrated torque settings stored in the host 22. These settings can be directly downloaded to the tool 16 via the FCU 25 for automatic adjustment of the tool 16 without the assistance of a conventional socket tray I/O. User-friendly symbols such as a floating icon can be displayed on the GUI 40 over a template of the workpiece 12 so that the operator 14 is continuously apprised of the assembly progress and past history, if so desired. For example, a template of the workpiece 12 can be displayed on the GUI 40, and a circle or other suitable icon can move toward the correct next position in the predetermined sequence 34 (see FIG. 2) to guide or prompt the operator 14, and/or text can be displayed to the same end.

Using the host 22 and the LPM 48, the algorithm 100 determines each of the linear acceleration and the rotational or angular velocity of a fastener 32 within the inertial reference frame XYZ of FIG. 1. The algorithm 100 integrates the inertial accelerations using the original velocity of the fastener 32 as the initial condition, and using the correct kinematics equations to calculate the inertial velocities of the fasteners 32 and integration again using the original position as the initial condition to calculate the inertial position of the fastener 32 over time. By using the original orientation of the LPM 48 and tool 16 in the inertial reference frame XYZ as the initial condition, and continuously monitoring the angular velocity provided by the LPM 48 (via the gyroscopes 66), the current orientation of the fastener 32 can be continuously updated. In other words, for each of the six degrees of freedom, i.e., X, Y, Z, θX, θY, and θZ, the algorithm 100 continuously calculates and updates the current position and orientation of the fastener 32. Control theory in general and a Kalman filter in particular can provide the means for combining the raw data provided by gyroscopes and accelerometers, such as the gyroscopes 66 and accelerometers 64 of FIG. 2A, to generate the necessary positional information of the fastener 32 as described above.

Figure 3:
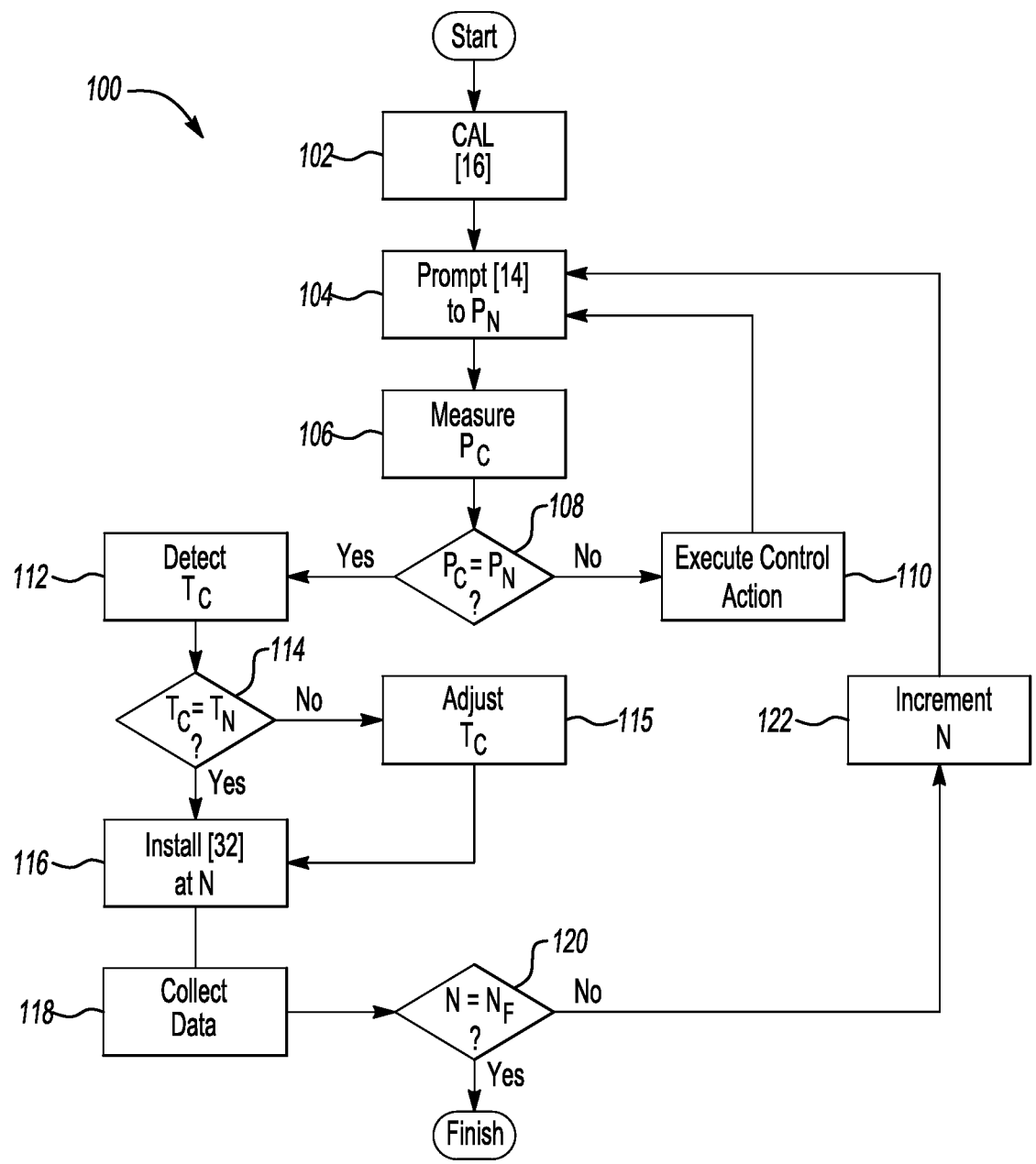
FIG. 3 is a flow chart describing a control algorithm or method for use with the LPS apparatus of FIG. 1.

Referring to FIG. 3, with reference to the various components of the LPS apparatus 50 of FIG. 2, a flow chart describes the method 100 in more detail. As noted above, the method 100 can be embodied by a computer-executed algorithm that is executed via the host 22. Any data collected by or at the tool 16 and/or resident within the host 22, including any data contained in the predetermined sequence 34 is readily accessible and usable by the method 100, or more particularly by any algorithmic embodiment of the method 100.

Beginning with step 102, the tool 16 is calibrated or zeroed at the start of a new cycle or run using the calibrated, fixed, or otherwise known position or coordinates of the base unit 20. As is typical with open-loop control methods, integration drift can occur within data provided by the LPM 48 over time. That is, small or incremental errors in measurement of the acceleration and angular velocity of the fasteners 32 can be integrated into progressively larger errors in velocity, which are then compounded into even larger errors in position. Therefore, before the start of a new cycle or assembly sequence, the initial position of the tool 16 is calibrated or zeroed at step 102. In this manner, the cumulative error can be limited to the error occurring in one cycle. In step 102, a pointer value "N" corresponding to the expected or anticipated first position of the first fastener can be initialized or set, such as by setting N=A in the exemplary A-F embodiment of FIG. 1. The method 100 then proceeds to step 104.

At step 104, the operator 14 is prompted via the GUI 40 to the anticipated or corresponding position (PN) within the cell 10, with the value of N corresponding to the correct fastener position within the predetermined sequence 34. As it is expected that the correct positions of each fastener 32 in the predetermined sequence 34 have been previously collected and recorded to properly train the algorithm 100, the algorithm 100 instantly knows whether the present position of the operator 14 is the correct or corresponding position (PN). After prompting the operator 14 by means such as but not limited to displaying of a text message or other suitable symbol on the GUI 30 of the tool 16, the algorithm 100 proceeds to step 106.

At step 106, the current position ($P_C$) of the fastener 32 is measured, detected, calculated, or otherwise determined using the LPS apparatus 50 and LPM 48, as described above. That is, the raw data 11 describing the motion of the LPM 48 and tool 16 within the XYZ reference frame is collected, and the present position of the fastener 32 a known distance away from the LPM 48 is calculated by the host 22 using the raw data 11 to determine the current position ($P_C$) as described above. The algorithm 100 then proceeds to step 108.

At step 108, the current position ($P_C$) is compared to the correct or corresponding position ($P_N$). If the values of PC and PN are not equal, the algorithm 100 proceeds to step 1 10. Otherwise, the algorithm 100 proceeds to step 1 12.

At step 110, a predetermined control action or actions can be selectively executed by the host 22. The control action can include any number of desired responses, such as but not limited to: temporarily disabling the tool 16 until the operator 14 moves to the correct position, displaying a warning message on the GUI 40 or other device, temporarily shutting down the process until corrective action can be taken, illuminating the external ANV device 41, etc. The algorithm 100 then repeats step 104.

At step 112, having determined at step 108 that the operator 14 is at the proper fastener position, i.e., $P_C=P_N$, the algorithm 100 measures, detects, or otherwise determines the current torque setting $T_C$ of the tool 16. Once the current torque setting ($T_C$) is determined, the method 100 proceeds to step 114.

At step 114, the current torque setting ($T_C$) of step 112 is compared to a calibrated torque setting $T_N$ with reference to the predetermined sequence 34 or a set of torque settings associated therewith. If $T_C=T_N$, the algorithm 100 proceeds to step 116. Otherwise, the algorithm 100 proceeds to step 115.

At step 115, the current torque settings ($T_C$) are automatically adjusted. The FCU 25 can be signaled to automatically adjust, update, or download the required torque settings to the tool 16 via the cable 70, as discussed above. The algorithm 100 then proceeds to step 116.

At step 116, the installation of the fastener 32 is completed using the now-validated torque setting $T_C$ at the current position $P_C$, with current position $P_C$ having been previously validated at step 108 as described above. The algorithm 100 then proceeds to step 118.

At step 118, the LPS apparatus 50 collects process data in an automatic mode, such that the process data is continuously collected and downloaded to the host 22 as it is collected, or as the values of the data changes. Process data as used herein refers to any data, measurements, or other information describing the installation at step 116, which can be used for various purposes, such as but not limited to quality assurance or quality control purposes, to improve operator training, to support a warranty return or repair process, etc. Alternately, the algorithm 100 can include periodically collecting such process data, for example by temporarily storing the data within the tool 16 and periodically transmitting or downloading the data to the host 22 at predetermined intervals, or when the tool 16 is returned to the base unit 20. The algorithm 100 then proceeds to step 120.

At step 120, the predetermined sequence 34 is once again referenced to see if the most recently completed fastener installation N corresponds to the last or final step of the sequence 34, i.e., $N_F$. If so, the tool 16 is returned to its base unit 20, where it is again zeroed as described above with reference to step 102. The method 100 is then finished. Otherwise, the method 100 proceeds to step 122.

At step 122, the value of N is incremented, with N corresponding to the corresponding position per the predetermined sequence 34. For example, if the correct or corresponding position is B in FIG. 1, the host 22 is automatically updated so that it expects or anticipates a move by the operator 14 to position B. The method 100 then repeats step 108 as set forth above.

Accordingly, by using the apparatus and method of the invention as set forth above the position of a fastening tool is located, validated, and error-proofed as an operator is automatically prompted to the correct position. Data collection associated with the apparatus and method can be initiated via a touch-screen GUI such as the GUI 40 of FIG. 1 to determine the number and position of any installed fasteners, as well as associated torque and angle data, all of which can be displayed on the GUI 40 or another device to provide instant feedback. End run data can be automatically collected and stored for future reference, such as by indentifying particular installation steps, batches, and/or individual operators that routinely coincide with a higher than expected error rate. In this manner, quality assurance can be optimized, and/or targeted training can be enabled, each ensuring optimal process efficiency.

While the best modes for carrying out the invention have been described in detail, those familiar with the art to which this invention relates will recognize various alternative designs and embodiments for practicing the invention within the scope of the appended claims.

The invention claimed is:

1. An apparatus for optimizing an assembly process within a confined work space, the apparatus comprising:
    a handheld assembly tool configured for completing the assembly process within the confined work space, wherein the handheld assembly tool is a handheld torque wrench having an axis of rotation and configured to install a threaded fastener as part of the assembly process;
    a local positioning module (LPM) connected to said handheld assembly tool, said LPM having a plurality of sensors configured to collect a set of raw data describing the motion of said LPM within the confined work space, wherein the plurality of sensors includes three gyroscopes and three accelerometers configured for measuring the motion of the LPM along a respective X-axis, a Y-axis, and a Z-axis of the LPM, three magnetometers configured for measuring a magnetic field in proximity to the LPM, and a temperature sensor configured for measuring a temperature of the LPM;

a host machine in wireless communication with the LPM and operable for calculating a present position of the LPM within the work space using the set of raw data, and for comparing the present position to a corresponding position in a predetermined assembly sequence; and a control unit in communication with the host machine and the handheld assembly tool, wherein the control unit is operable for automatically updating a torque setting of the handheld assembly tool in response to a signal from the host machine;

wherein the host machine is operable for signaling the control unit to automatically update the torque setting, and is further operable for executing at least one control action when the present position is not equal to the corresponding position.

2. The apparatus of claim 1, wherein said host machine uses a Kalman filter for calculating said present position using said set of raw data.

3. The apparatus of claim 1, wherein said handheld assembly tool includes a shaft portion having a longitudinal axis, and wherein said LPM is positioned on said longitudinal axis.

4. The apparatus of claim 1, wherein the apparatus includes a display device for displaying a message from said host machine.

5. The apparatus of claim 1, wherein said at least one control action is selected from the group consisting of: temporarily disabling said handheld assembly tool, illuminating an audio/visual device, and displaying a message to an operator of said handheld assembly tool.

6. A method for optimizing a fastener installation process within a confined work space, the method comprising:

collecting a set of raw data describing the motion of a handheld torque wrench within the work space using a local positioning module (LPM) that is connected to the handheld torque wrench, wherein the handheld torque wrench includes a plurality of sensors for collecting the set of raw data, with the sensors including three gyroscopes, three accelerometers, three magnetometers, and a temperature sensor;

calculating, via a host machine in wireless communication with the handheld torque wrench, a present position of a threaded fastener being installed by the handheld torque wrench using the set of raw data;

selectively updating an assembly setting of the handheld torque wrench in response to a signal from the host machine using a control unit in communication with the host machine;

comparing the present position of the threaded fastener to a corresponding position in a predetermined assembly sequence; and temporarily disabling the handheld torque wrench when the present position is not equal to the corresponding position.

7. The method of claim 6, further comprising:

detecting the present torque setting of said handheld torque wrench;

comparing said present torque setting to a corresponding torque setting of said corresponding position; and automatically updating said present torque setting to match said corresponding torque setting when said present torque setting is not equal to said corresponding torque setting.

8. The method of claim 6, including a graphical user interface (GUI), the method further comprising: prompting an operator of said handheld torque wrench with said corresponding position using said GUI.

9. The method of claim 8, further comprising: activating an audio/visual alarm device external to the confined work space when said present position of said threaded fastener is not equal to said corresponding position.

10. The apparatus of claim 1, wherein:

the handheld assembly tool is a handheld torque wrench having an axis of rotation and configured to install a threaded fastener as part of the assembly process;

the LPM is connected to the torque wrench on the axis of rotation; and the host machine is configured for:

calculating a present position of the threaded fastener;

comparing the present position of the threaded fastener to the corresponding position in the predetermined sequence; and signaling the control unit to update a present torque setting of the torque wrench as the assembly setting.

11. The apparatus of claim 1, wherein the host machine is configured for temporarily disabling the handheld assembly tool as the at least one control action.

* * * * *